(12) United States Patent
Brock et al.

(10) Patent No.: US 6,499,028 B1
(45) Date of Patent: Dec. 24, 2002

(54) EFFICIENT IDENTIFICATION OF CANDIDATE PAGES AND DYNAMIC RESPONSE IN A NUMA COMPUTER

(75) Inventors: Bishop Chapman Brock; Eli Chiprout; Elmootazbellah Nabil Elnozahy; David Brian Glasco; Ramakrishnan Rajamony; Freeman Leigh Rawson, III; Ronald Lynn Rockhold, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,625

(22) Filed: Mar. 31, 1999

(51) Int. Cl.[7] .............................................. G06F 17/00
(52) U.S. Cl. .............................. 707/4; 714/47; 709/249
(58) Field of Search .............................. 714/37, 39, 41, 714/47, 48, 4, 25, 26, 43; 707/3–6, 100–102; 709/203, 249, 250; 711/148, 147; 712/210

(56) References Cited

U.S. PATENT DOCUMENTS

| | | | | |
|---|---|---|---|---|
| 6,349,379 B2 | * | 2/2002 | Gibson et al. | 712/210 |
| 6,349,394 B1 | * | 2/2002 | Brock et al. | 709/249 |
| 6,393,530 B1 | * | 5/2002 | Greim et al. | 711/147 |
| 6,393,545 B1 | * | 5/2002 | Long et al. | 711/148 |

OTHER PUBLICATIONS

Toncev et al., "The impact of out–of–order message delivery on cache coherence protocols", Electrical and Computer Engineering, 2001, Canadian Conference on, vol. 1, 2001, pp. 399–404.*

Novillo et al., "On–Line Debugging and Performance monitoring with barriers", Parallel and Distributed Processing Symposium, Proceedings 15th International, 2001, 8oo.*

Shah et al., "Analysis of a Statistics Counter Architecture", Hot Interconnects 9, 2001, pp. 107–111.*

* cited by examiner

Primary Examiner—David Jung
(74) Attorney, Agent, or Firm—Joseph P. Lally; Casimer K. Salys

(57) ABSTRACT

A performance monitor configured to count memory transactions and to issue an interrupt to the computer system if the monitor detects a specified number of transactions associated with a particular segment of the physical address space of the system. The monitor includes an interface suitable for coupling to an interconnect network of a computer system and configured to extract physical address information from a transaction traversing the interconnect network, a translation module adapted for associating the extracted physical address with one of a plurality of memory blocks and, in response thereto, incrementing a memory block counter corresponding to the memory block, and an interrupt unit configured to assert an interrupt if the block counter exceeds a predetermined value. The interface unit is configurable to selectively monitor either incoming or outgoing transactions and the translation unit preferably includes a plurality of region filters each comprising one or more of the memory blocks. In the preferred embodiment, the plurality of block counters are implemented with a random access memory device. In one embodiment useful for simulating operation of the system and for checking the design of the performance monitor, the monitor further includes a transaction generator coupled to the interconnect network and configured to issue specified remote memory transactions at specified intervals if a monitor enable bit of the performance monitor is disabled. In one embodiment, the transaction generator is configurable to issue either outgoing transactions or incoming transactions.

20 Claims, 8 Drawing Sheets

EFFICIENT IDENTIFICATION OF CANDIDATE PAGES AND DYNAMIC RESPONSE IN A NUMA COMPUTER

CROSS REFERENCE TO RELATED APPLICATIONS

The present invention is related to the subject matter of the following U.S. Patent application: Performance Monitoring in a NUMA Computer, Brock, Chiprout, Elnozahy, Glasco, Rajamony, Rawson, and Rockhold, filed on the filing date of this application, U.S. application Ser. No. 09/282626, now U.S. Pat. No. 6,349,394.

BACKGROUND

1. Field of the Present Invention

The present invention generally relates to the field of computer systems and more particularly to the monitoring of memory performance in a non-uniform memory architecture system.

2. History of Related Art

The use of multiple processors to improve the performance of a computer system is well known. In a typical arrangement, a plurality of processors are coupled to a system memory via a common bus referred to herein as the system or local bus. The use of a single bus ultimately limits the ability to improve performance by adding additional processors because, after a certain point, the limiting factor in the performance of a multiprocessor system is the bandwidth of the system bus. Generally speaking, the system bus bandwidth is typically saturated after a relatively small number of processors have been attached to the bus. Incorporating additional processors beyond this number generally results in little if any performance improvement.

Distributed memory systems have been proposed and implemented to combat the bandwidth limitations of single bus systems. In a distributed memory system, two or more single bus systems referred to as nodes are connected to form a larger system. Each node typically includes its own local memory. One example of a distributed memory system is referred to as a non-uniform memory architecture (NUMA) system. A NUMA system is comprised of multiple nodes, each of which may include its own processors, local memory, and corresponding system bus. The memory of each node is accessible to each other node via a high speed interconnect network that links the various nodes. The use of multiple system busses (one for each node) enables NUMA systems to employ additional processors without incurring the system bus bandwidth limitation experienced by single bus systems. Thus, NUMA systems are more suitably adapted for scaling than conventional systems.

In a NUMA system, the time required to access system memory is a function of the memory address because accessing memory local to a node is faster than accessing memory residing on a remote node. In contrast, access time is essentially independent of the memory address in conventional SMP designs. Software optimized for use on conventional machines may perform inefficiently on a NUMA system if the software generates a large percentage of remote memory accesses when executed on the NUMA system. The potential for performance improvement offered by scaleable NUMA systems may be partially offset or entirely negated if, for example, the paging scheme employed by the NUMA system allocates a code segment of the software to the physical memory of one node and a data segment that is frequently accessed by the processors of another node. Due to variations in memory architecture implementation, paging mechanisms, caching policies, program behavior, etc., tuning or optimizing of any given NUMA system is most efficiently achieved with empirically gathered memory transaction data. Accordingly, mechanisms designed to monitor memory transactions in NUMA systems are of considerable interest to the designers and manufacturers of such systems.

SUMMARY OF THE INVENTION

Accordingly, it is an objective of the present invention to provide a performance monitor configured to count and categorize memory transactions in a computer system. In one embodiment, the monitor is connected directly to the computer system's interconnect network. In an alternative embodiment, the monitor may be connected to the system bus of a node on the computer system. The monitor may be suitably implemented with commercially available programmable gate arrays and packaged as a circuit board that includes connector sockets suitable for permitting the monitor to tap into the interconnect network. In an embodiment in which the monitor is coupled to the interconnect network, the monitor may include a I/O interface for communicating with the computer system via a standard I/O bus such as a PCI bus. In an embodiment in which the monitor resides on a system bus, direct communication with the computer may be achieved via the system bus thereby eliminating the need for an I/O bus interface.

Broadly speaking, a first application of the invention emphasizing the ability to separately monitor concurrently executing programs contemplates a computer system comprised of a local node including at least one processor coupled to its local memory via a local bus of the local node. A remote node of the system includes at least one processor coupled to a memory local to the remote node via a local bus of the remote node. An interconnect network couples the remote node to the local node such that the processor of the local node can access memory local to the remote node and the processor of the remote node can access memory local to the local node. The system further includes a performance monitor including an interface coupled to the interconnect network and configured to extract, at a minimum, physical address information from a transaction traversing the interconnect network, a filter module adapted for associating the physical address with one of multiple memory blocks, and an address mapping module configured to associate the appropriate memory block with one or more access counters. The performance monitor is preferably configured such that each access counter is associated with a memory region owned by a program thereby providing means for counting memory transactions associated with the program.

The first application of the invention further contemplates a performance monitor that includes an interface, a filter module, and an address mapping module. The interface is suitable for coupling to an interconnect network of a computer system or to a system bus of a node within the computer system depending upon the location of the monitor. The interconnect network links a local node of the system with at least one remote node. The interface is configured to extract, at a minimum, physical address information from a transaction traversing the network or bus to which the monitor is coupled. In addition to physical address information, other pertinent information such as transaction type information and node identification information may be contained in and extracted from the transaction. The filter module associates the physical address with one of several memory blocks, where each memory block corresponds to a contiguous portion of the system's physical address space. The address mapping module associates the identified memory block with one or more access counters and increments each of the associated access counters where each access counter corresponds to one of multiple concurrently executing programs. The association between the selected memory block and the access counters is facilitated by a pointer field corresponding to each memory block.

In one embodiment of the performance monitor, the interface unit may be configured, such as by the appropriate setting of a direction selection bit in a performance monitor status register, to selectively monitor either incoming or outgoing transactions. In another suitable arrangement, the monitor is configured to monitor both incoming and outgoing transactions simultaneously. In one embodiment, the filter module includes a stage comprised of multiple region filters that are adapted to receive pertinent transaction information including the transaction's physical address information. Typically, each of the region filters is associated with a contiguous region of the system's physical address space. In response to receiving the pertinent information, each of the region filters output a signal that indicates whether the transaction fulfills a set of criteria corresponding to the filter. The pertinent information may include, for example, transaction type information and node identification information in addition to the transaction's physical address information. Correspondingly, the criteria for each filter may include transaction type criteria and node identification criteria as well as physical address criteria. In one embodiment, each region filter includes a match register and a mask register that cooperatively define the criteria corresponding to the filter. The programming of the region filter registers is preferably achieved via a programming interface that couples the registers of the performance monitor to a communication bus. In embodiments in which the monitor resides on the system's interconnect network, a standard I/O bus such as a PCI bus may be employed as the communication bus while, in embodiments in which the monitor resides on the system bus, the system bus itself may suitably provide the means for communication with the monitor.

In the preferred embodiment, each memory region is further divided into one or more of the memory blocks. In this embodiment, region descriptors including a block number field indicating the number of the memory blocks in the region and a block size field indicating the size of each memory block are utilized. Each memory block is associated with a corresponding block counter adapted to increment if the transaction attributes (i.e., address, type, node id) match the corresponding region filter criteria and the transaction's address lies within the memory block corresponding to the block counter. In the preferred embodiment, each memory block is associated with a pointer field. The contents of the pointer field identify one or more access counters that are associated with the memory block. When a memory block counter is incremented, the address mapping module utilizes the pointer field to increment the access counter(s) associated with the memory block. The pointer fields and access counters provide a mechanism for accumulating transaction information from discontiguous physical memory regions into a single counter thereby providing means for counting transactions associated with a particular virtual memory space. In an embodiment suitable for signaling the system upon the occurrence of certain specified conditions, the performance monitor may suitably include an interrupt unit configured, in conjunction with an interrupt mask of the region descriptor, to issue a hardware interrupt if any of the memory block counters in the region reaches a threshold value.

The first application of the present invention still further contemplates a method of monitoring performance of a computer system. One or more programs are executed on a computer system that includes two or more nodes (including at least a local node and a remote node) coupled together via an interconnect network. Physical address information is then extracted from transactions traversing the interconnect network and associated with one of the memory blocks based upon predefined memory block boundaries. The identified memory block is then associated with at least one of a plurality of access counters. The appropriate access counters are then incremented. Preferably, the step of defining the memory blocks includes defining boundaries for a plurality of physical address regions and further defining the number and size of multiple memory blocks within each of the regions. In one embodiment, the method includes a step in which incoming or outgoing transactions are selected for monitoring, preferably by setting an appropriate bit in a status register of the performance monitor. The associating of the selected memory block with the access counters preferably includes interpreting a pointer field corresponding to the memory block, where the pointer field indicates which of the access counters are associated with the memory block. In one embodiment, the method further includes issuing an interrupt if any of the access counters exceeds a specified threshold value.

A second application of the present invention contemplates a performance monitor configured to count memory transactions and to issue an interrupt to the computer system if the monitor detects a specified number of transactions associated with a particular segment of the physical address space of the system. This embodiment of the invention includes an interface suitable for coupling to an interconnect network of a computer system and configured to extract, at a minimum, physical address information from a transaction traversing the interconnect network. The monitor further includes a filter module adapted for associating the extracted physical address with one of a plurality of memory blocks and, in response thereto, incrementing a memory block counter corresponding to the memory block. An interrupt unit of the monitor is configured to assert an interrupt if the block counter exceeds a predetermined value. In the same manner as the application of the invention discussed above, one embodiment of the interface unit is configurable to selectively monitor either incoming or outgoing transactions and the translation unit preferably includes a plurality of region filters each comprising one or more of the memory blocks. In the preferred embodiment, the plurality of block counters are implemented with an array of random access memory device such as an array of static RAMs. Each of the block counters is associated with a programmable interrupt disable bit operable to prevent the interrupt unit from asserting an interrupt corresponding to the associated block counter.

In one embodiment useful for simulating operation of the system and for checking the design of the performance monitor, the monitor further includes a transaction generator coupled to the interconnect network and designed to issue specified remote memory transactions at specified intervals if the transaction generator is enabled. In one embodiment, the enabling of the transaction generator and the performance monitor are controlled by a common bit such that the transaction generator is enabled whenever the performance monitor is disabled. In one embodiment, the transaction generator is configurable to issue either incoming or outgoing transactions.

The second application of the present invention still further contemplates a computer system that includes a local node, at least one remote node, an interconnect network coupling the remote node to the local node, and a performance monitor. The performance monitor includes an interface unit configured to extract, at a minimum, physical address information from transactions on the interconnect network and a filter module that is designed to associate the transaction's physical address with one of a plurality of memory blocks and increment a block counter corresponding to the memory block. The monitor further includes an interrupt unit configured to assert an interrupt if the block counter exceeds a predetermined value. The filter module preferably includes a plurality of region filters that are adapted to receive a transaction's physical address information. Each of the region filters is associated with a memory region and each memory region is comprised of one or more of the memory blocks. The size and number of memory blocks within a given region is programmably alterable in the preferred embodiment. In one embodiment, the computer system is configured to respond to the interrupt by subdividing the memory blocks of the region associated with the interrupt into smaller memory blocks prior to obtaining additional performance monitor data thereby providing means for gathering increasingly detailed information about increasingly smaller portions of the physical address space. In another embodiment emphasizing dynamic performance improvement, the computer system operating software is configured to respond to the interrupt by migrating the contents of the memory block responsible for triggering the interrupt to physical address space located on a different node in an effort to find a physical home for the memory block contents that produces a minimum number of remote access. The system may further include a transaction generator coupled to the interconnect network and operable to issue specified interconnect transactions at specified intervals if the performance monitor is enabled.

The second application of the present invention still further contemplates a method of monitoring performance of a computer system in which, initially, physical address boundaries are defined for a plurality of memory blocks. Physical address information is then extracted from transactions traversing an interconnect network of the computer system. The physical address is then associated with one of the memory blocks and a memory block counter corresponding to memory block is then incremented. An interrupt is then asserted if the block counter exceeds a specified value. In a presently preferred embodiment, the step of defining the memory blocks includes defining one or more memory regions by programming one or more base address fields of corresponding region descriptors and dividing the memory region into the memory blocks by programming block sizes and block counts for each of the region descriptors. In one embodiment, the contents of the memory block responsible for the interrupt are migrated to a different node in response to the interrupt. In another embodiment, the memory block responsible for the interrupt is subdivided into smaller memory blocks in response to the interrupt and prior to performing additional monitoring.

BRIEF DESCRIPTION OF THE DRAWINGS

Other objects and advantages of the invention will become apparent upon reading the following detailed description and upon reference to the accompanying drawings in which.

Figure 1:
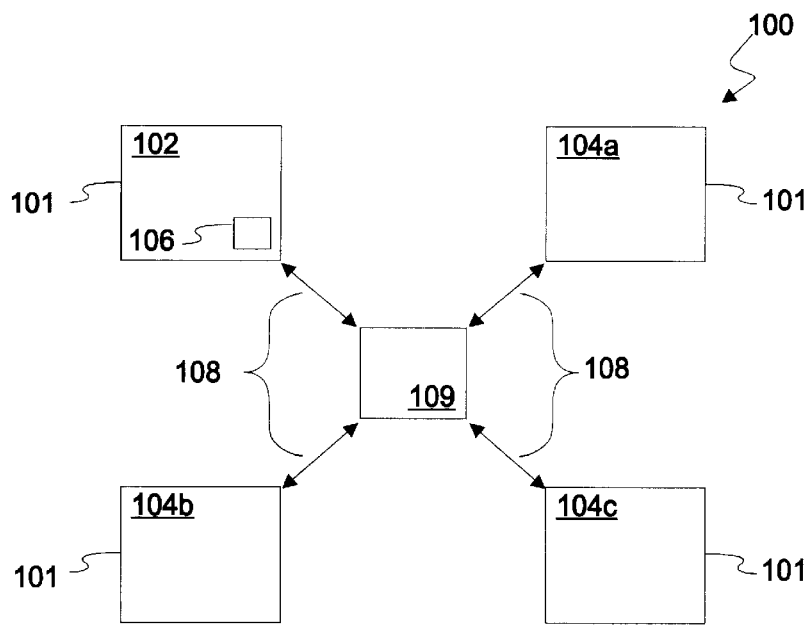
FIG. 1 is a diagram of a computer system according to the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Turning now to the drawings, FIG. 1 depicts a computer system 100 according to one embodiment of the present invention. The depicted embodiment of computer system 100 is comprised of a plurality of nodes 101 designated for purposes of facilitating the discussion herein as local node 102 and one or more remote nodes 104a, 104b, . . . 104n (collectively referred to as remote nodes 104). In one embodiment of computer system 100, each node 101 is essentially equivalent to the remaining nodes and the identification of one node as a local node is intended merely to provide a frame of reference with respect to certain transactions and components. Local node 102 and remote nodes 104 are coupled to one another via an interconnect network 108 through a switch 109. The embodiment depicted includes a total of four nodes 101 where each node is coupled to all other nodes through switch 109, but those skilled in the design of distributed memory computer systems will readily appreciate that additional nodes may be added to (or removed from) system 100 and that the nodes may be interconnected with any of a variety of interconnect mesh topologies. The preferred embodiment of computer system 100 contemplates a non-uniform memory architecture (NUMA) in which each node 101 of the system includes a local memory 128 (depicted in FIG. 2) to which the node has relatively inexpensive or fast access (referred to herein as a local access). In addition, each node 101 is capable of accessing the local memories of the other nodes via interconnect 108 and switch 109 with an access (referred to herein as a remote access) that is slower than a local access. In contrast to a NUMA computer system, a symmetrical multi-processing (SMP) system as used herein describes an architecture in which each of a plurality of system processors has essentially equally fast access to the system's memory.

One component of optimizing program performance on a NUMA computer system is concerned with minimizing the number of remote accesses that a program initiates during execution. (For purposes of this disclosure, the word program encompasses a wide variety of software including operating systems and applications). The difficulty in achieving this goal in a portable manner is substantial because the memory layout is usually program and machine dependent, complex in nature, and available only to a limited number of programs in the system. Accordingly, it is preferable to gather accurate information concerning the performance of a program executing on any given NUMA system empirically. To assist in this task, performance monitor 106 of local node 102 of computer system 100 counts and categorizes remote accesses by monitoring transactions that traverse interconnect network 108. Although not depicted, each node 101 includes its own performance monitor 106 in the preferred embodiment of system 100. In one embodiment, performance monitor 106 is configurable to count either incoming transactions (accesses to the local memory of local node 102 originating from remote nodes 104) or outgoing transactions (accesses to the local memories of remote nodes 104 originating from local node 102). Configuring performance monitor 106 to selectively monitor either incoming or outgoing transaction is achieved in one embodiment by appropriate setting of a direction selection (DS) bit 521 of a performance monitor status register 520 (depicted in FIG. 5C).

Figure 2:
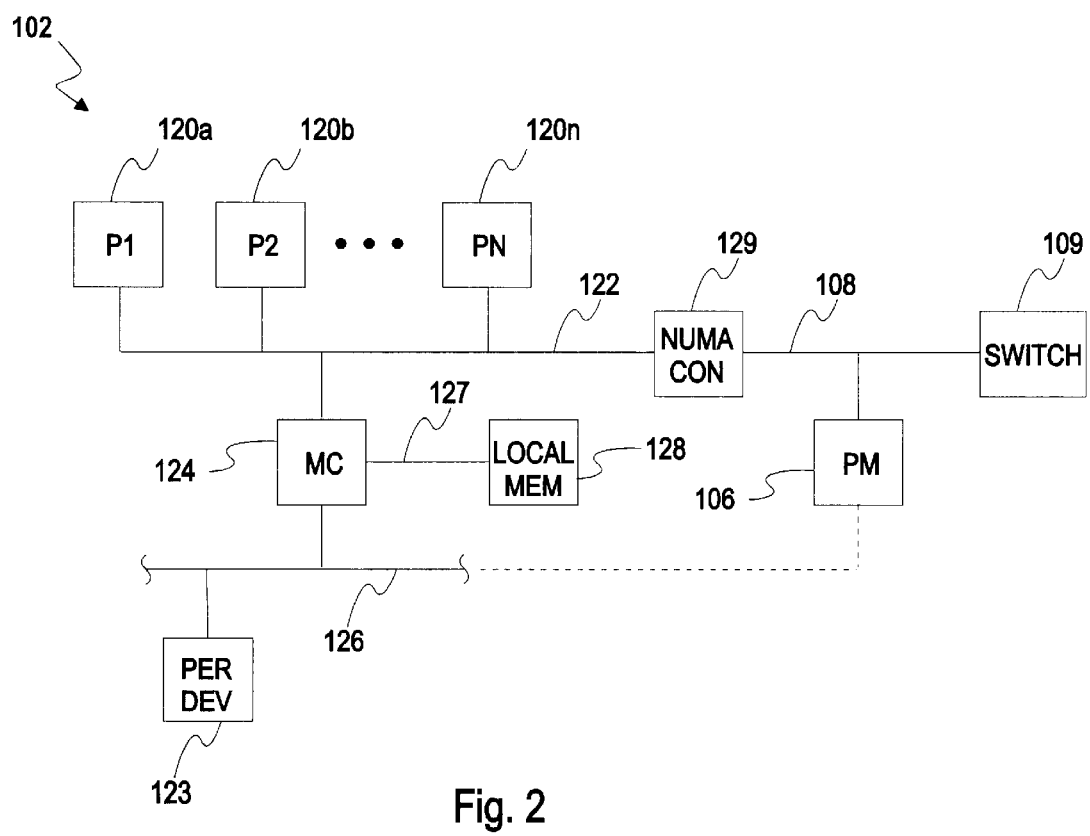
FIG. 2 is a simplified block diagram of a node of the computer system of FIG. 1.

Before discussing performance monitor 106 in further detail, a general description of local node 102 is presented in conjunction with FIG. 2, which depicts one embodiment of local node 102 in simplified block diagram fashion. Local node 102 as depicted in FIG. 2 includes one or more processors 120 that communicate with each other and with other components of local node 102 via a system or local bus 122. Each processor 120 may include one or more levels of cache memory (not depicted) for storing relatively small portions of data and instructions in a relatively fast memory such as an array of static random access memory (SRAM) devices. Processors 120 are coupled to a local memory 128 and to an I/O bus 126 through a memory controller (MC) 124. Local memory 128, which is coupled to MC 124 via a memory bus 127, is suitably comprised of an array of dynamic random access memory (DRAM) devices. I/O bus 126 is typically implemented with any of a variety of standardized bus architectures including, for example, Revision 2.2 of the PCI Local Bus Standard published by the PCI Special Interest Group (www.pcisig.com) and incorporated by reference herein. The PCI bus is designed to provide a high throughput I/O facility for local node 102. A peripheral device 123 is depicted as coupled to I/O bus 126. In an embodiment in which I/O bus 126 comprises a PCI bus, peripheral device 123 may comprise a graphics adapter, video controller, hard disk controller, high speed network adapter, or other suitable device. The widespread prevalence of the PCI bus as a vehicle for communicating with processors is utilized in one embodiment of the present invention in which I/O bus 126 is a PCI bus and communications to and from PM 106 are accomplished via I/0 bus 126. This embodiment of local node 102 is indicated by the dashed line extending from I/O bus 126 to PM 106. Other examples of bus standards with which I/O bus 126 may comply include the ISA, EISA, and MCA standards. In addition, local node 102 may further include a second bus bridge (not depicted) attached to I/O bus 126 to provide facilities for a second I/O bus architecture within local node 102. In one embodiment, for example I/O bus 126 is a PCI bus to which a PCI/ISA bus bridge is attached to provide facilities for receiving ISA compliant devices such as keyboards, pointing devices (mice), and the like. Local node 102 further includes a NUMA controller 129 connected between interconnect 108 or computer system 100 and system bus 122. In the depicted embodiment, performance monitor 106 is connected to interconnect network 108. In other embodiments, not depicted, performance monitor 106 may connect directly to system bus 122. This embodiment would have the advantage of being able to monitor local transactions as well as remote transactions.

Figure 3:
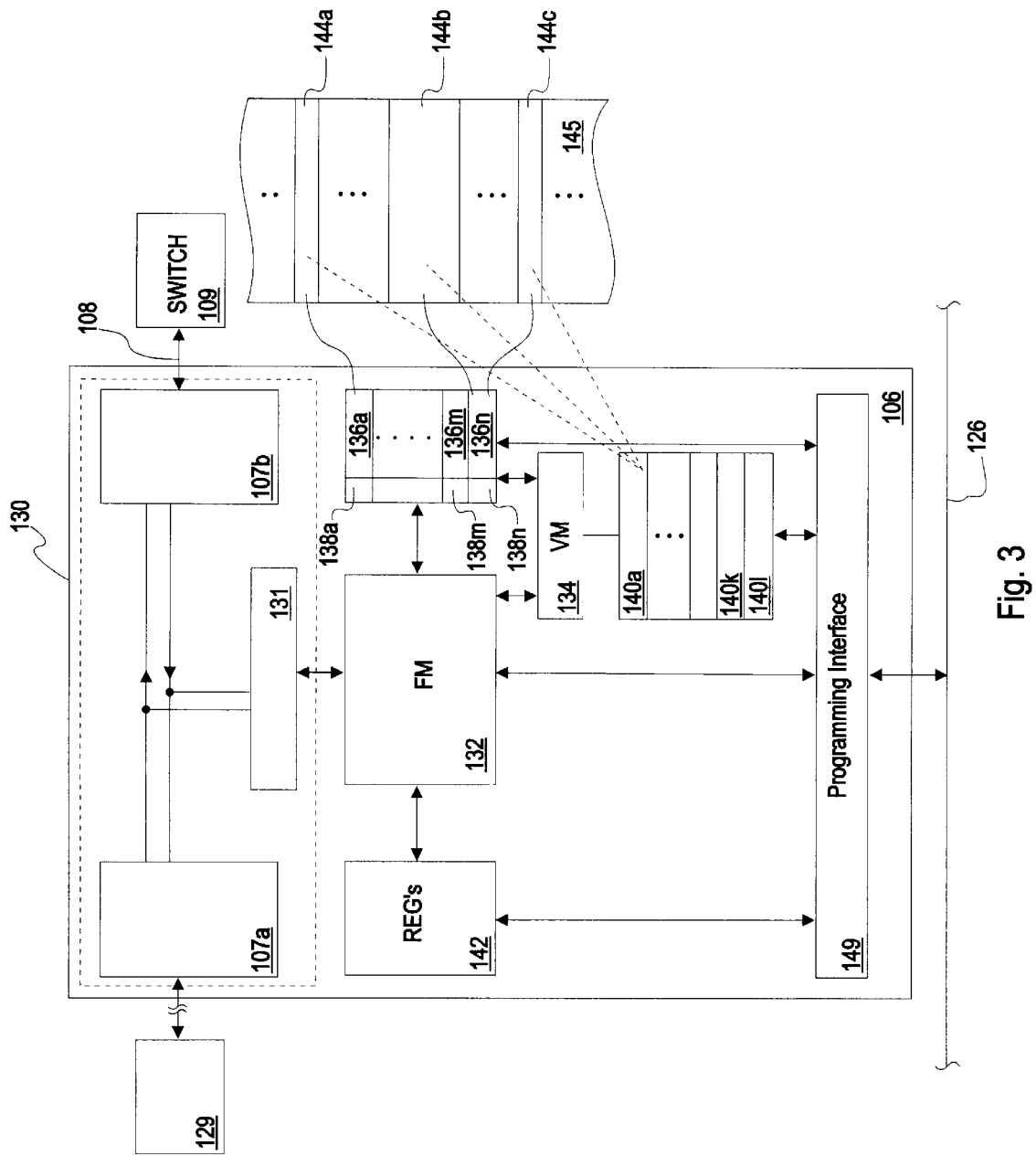
FIG. 3 is a simplified block diagram of a performance monitor according to the present invention.

Turning now to FIG. 3, an embodiment of performance monitor 106 suitable for separately monitoring two or more concurrently running programs is presented. In the depicted embodiment, performance monitor 106 includes an interface unit 130 that monitors interconnect network 108 of computer system 100. Interface unit 130 is configured to detect remote memory transactions as they traverse interconnect network 108 between local node 102 and any of the remote nodes 104. In the preferred embodiment of computer system 100, interconnect network 108 bandwidth is preserved and system performance is improved when programs are constructed to minimize network transactions (i.e., memory transactions initiated by one node that cannot complete without retrieving data from another node). It should be noted that network transactions result not only from remote accesses, in which a processor on one node executes a load/store to the local memory of another node, but also when the cache coherency policies of system 100 require an inter-node data transfer to complete a local transaction. Gathering data about network transactions is a critical step in tuning or optimizing application and operating system software for use on the NUMA system under consideration. It will be appreciated that the depicted embodiment of performance monitor 106 is associated with local node 102 and monitors only those remote transactions that either originate or terminate at local node 102. If, for example, remote node 104a issues a transaction requiring a memory access to the local memory of remote node 104b, this transaction would not be monitored by performance monitor 106 as implemented in the depicted embodiment even though the transaction comprises a remote access. To adequately monitor all remote accesses that occur, one embodiment of computer system 100 contemplates that each remote node 104 includes its own performance monitor. With each node 101 of computer system 100 equipped with a performance monitor such as performance monitor 106 of local node 102, system wide performance monitoring is facilitated.

In one embodiment desirable for its flexibility during a design phase of performance monitor 106, portions of interface unit 130 and other components of performance monitor 106 are implemented with commercially distributed programmable gate arrays. In embodiments in which the design of performance monitor 106 has been substantially completed and changes to the layout are not expected, performance monitor 106 may be fabricated as an application specific integrated circuit (ASIC) using a dedicated mask set. In either case, portions of interface unit 130 and other components of performance monitor 106 are preferably designed to operate with a 3.3V power supply using low voltage TTL logic levels. Interconnect network 108 of computer system 100, on the other hand, might suitably be designed with a high speed architecture that uses low-swing pseudo-differential signals in which signal levels above a specified threshold are interpreted as a logic high and signal levels below the threshold as a logic low to achieve high signaling speeds on interconnect network 108 by minimizing delays associated with signal rise and fall times. The discrepancy between the signal levels that drive the logic of performance monitor 106 and the interconnect network 108 is accommodated within interface unit 130 by the presence of signal processing devices 107*a* and 107*b*, which are configured to provide a TTL compatible representation of memory transactions traversing network 108. In one embodiment, interface unit 130 further includes an extraction unit 131 configured to extract pertinent information from memory transactions detected on interconnect network 108. This pertinent information preferably includes physical address information and may further include additional information such as transaction type information and node identification information. Transactions present on interconnect network 108 may include data and control information that is not needed to accomplish the essential task of gathering information about which memory addresses are responsible for the remote accesses that take place on computer system 100. To significantly reduce the amount of circuitry required to implement the preferred embodiment of performance monitor 106, only essential information is extracted from memory transactions on interconnect network 108 and forwarded to filter module 132. In one exemplary embodiment, memory transactions on interconnect network 108 include 128 bits of information while the essential information extracted from the transaction includes just 41 bits including, for example, a physical address field, a transaction type field, and a node ID field. As implied by their names, the transaction type field indicates the type of a transaction (e.g., read transaction, write transaction, read-with-intent-to-modify transaction, etc.) while the node id field indicates the other node associated with the transaction.

Figure 4:
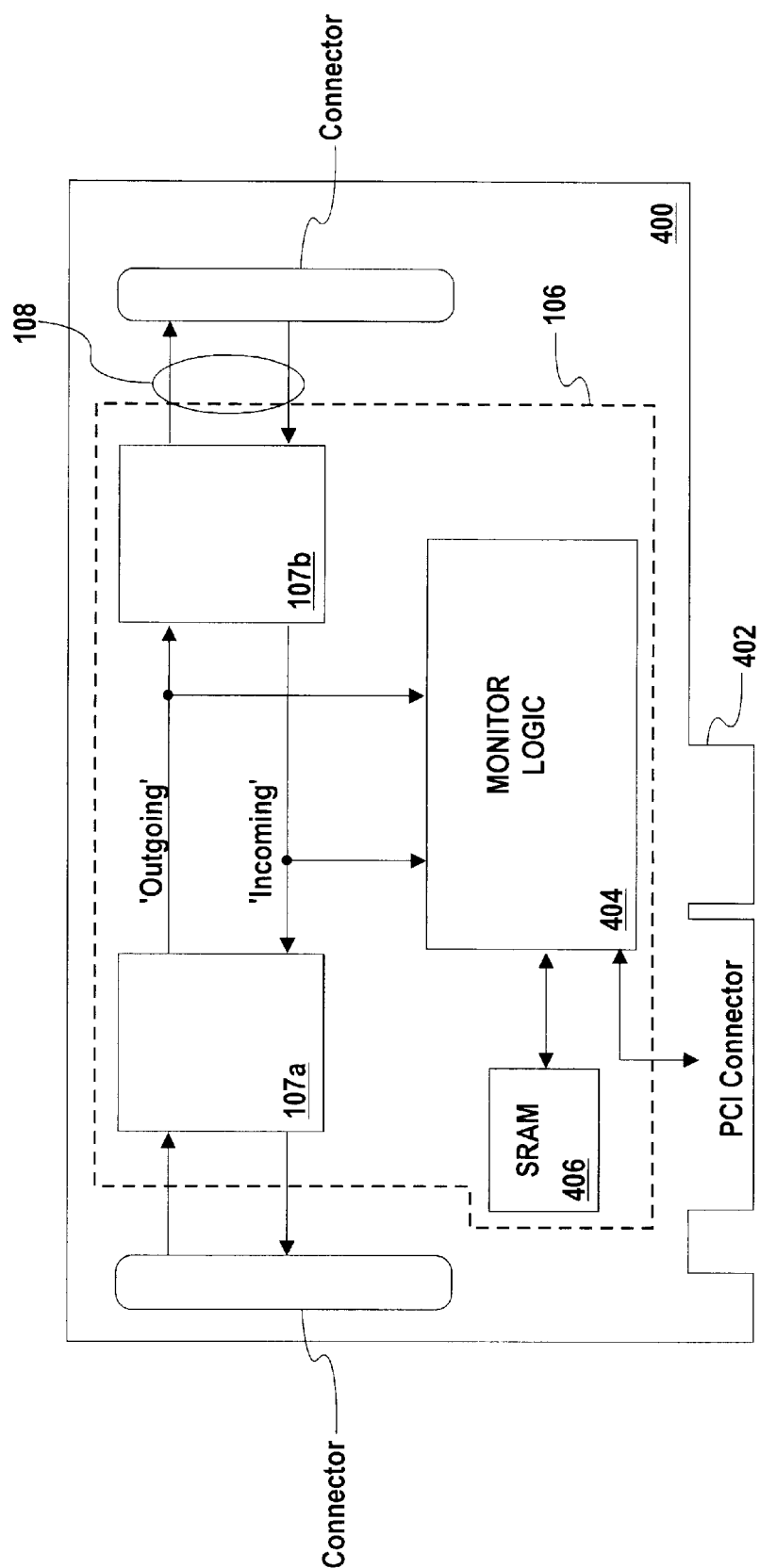
FIG. 4 is a top plan view of a circuit board embodiment of the performance monitor of FIG. 3 for use in the computer system of FIG. 1.

The information extracted from memory transactions by extraction unit 131 is forwarded to filter module 132. Upon receiving this extracted information from interface unit 130, filter module 132 associates the physical address of the detected transaction with one of a plurality of memory blocks 144. Each memory block 144 corresponds to a contiguous portion of the physical address space 145 of computer system 100 that is being monitored. Physical address space 145 encompasses the entire memory of computer system 100 in addition to the system's I/O space. To provide maximum flexibility in the ability to monitor selected portions of physical address space 145, the boundaries that define each of the memory blocks 144 are programmably set prior to monitoring via programming interface 149. In one embodiment, programming interface 149 provides an interface between programmable portions of performance monitor 106 and I/O bus 126 of local node 102. (In another embodiment, not depicted, suitable for monitoring additional memory transaction information such as, for example, processor ID information, performance monitor 106 is coupled to system bus 122 and communication with programmable portions of monitor 106 is accomplished via system bus 122). In embodiments of local node 102 in which I/O bus 126 is a PCI bus, utilizing I/O bus 126 as the communication channel between computer system 100 and performance monitor 106 can ease the design of performance monitor 106 and programming interface 149 by taking advantage of a widely used and well documented bus protocol. Turning briefly to FIG. 4, an embodiment of performance monitor 106 is shown as implemented on a printed circuit board 400 suitable for coupling to I/O bus 126 of local node 102 via PCI connector 402. In this depiction, performance monitor 106 includes monitor logic 404 comprised of one or more field programmable gate arrays or application specific devices, a static memory device 406 used to store block counters 136 as discussed below, and the signal processing devices 107*a* and 107*b* discussed previously.

Returning now to FIG. 3, filter module 132, based upon programmed settings defining boundaries for memory blocks 144, associates the physical address extracted by extraction unit 131 with at least one of the memory blocks 144. In the depicted embodiment, each memory block 144 corresponds to a memory block counter 136. Filter module 132 increments the memory block counter 136 of each memory block 144 with which the physical address is associated. Implementing the mechanism by which the boundaries of memory blocks 144 are defined in performance monitor 106 involves a tradeoff between flexibility and feasibility. In an embodiment emphasizing flexibility, upper and lower addresses or, alternatively, a base address and a range could be defined for each memory block 144 and stored in dedicated registers. While this implementation offers the advantage of randomly defined address boundaries for each memory block 144 without regard to the address boundaries of the remaining blocks 144, it will be appreciated that, if a significant number of memory blocks are to be monitored, the number of dedicated registers necessary to implement such a scheme would quickly consume a considerable portion of the performance module resources and cost. In an implementation designed to emphasize feasibility and to reduce the number of dedicated registers required to define memory blocks 144, the block size of each memory block 144 could be fixed. In this manner complete definition of each block would require only a base address. Although this design saves resources over the previously discussed implementation, it introduces constraints imposed by fixed block sizes without totally eliminating the problem of requiring additional dedicated resources for each defined memory block 144. A suitable implementation designed to provide sufficient flexibility to define a very large number of memory blocks while simultaneously addressing the problem of scarce resources is achieved with an embodiment of the present invention in which physical address space 145 is first divided, through software programming, into a relatively few number of randomly defined memory regions. The memory regions are then further divided into a selectable number of memory blocks 144 where each block in a given region has a fixed size, but where the block size of memory blocks 144 in different regions may differ.

Figure 5A:
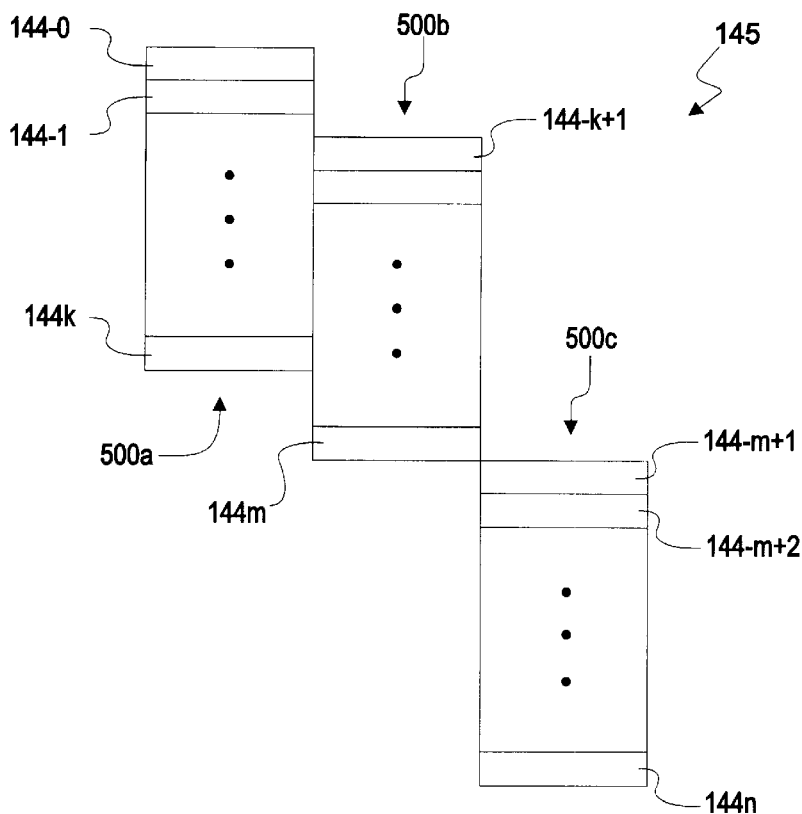
FIG. 5A is a conceptual representation of the physical address space of the computer system of FIG. 1 as perceived by the performance monitor of the present invention.
Figure 5B:
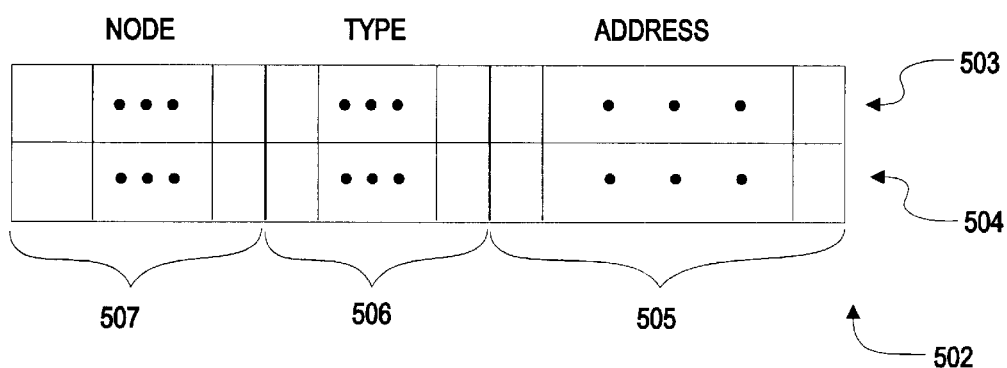
FIG. 5B is a diagram of region filter registers according to the present invention.

A representation of this partitioning of physical address space 145 is presented in FIG. 5A in which physical address space 145 includes a plurality of memory regions 500*a*, 500*b*, . . . 500*n* (collectively referred to as regions 500. The relative positioning of the upper and lower address boundaries of regions 500 as depicted in FIG. 5A is intended to reflect the possibility of memory regions 500 that overlap portions of physical address space 145. The boundaries of each region 500 are independently programmable as described herein. Turning to FIG. 5B, a region filter 502 according to one embodiment is depicted. Region filter 502 includes a match register 503 and a mask register 504. Match and mask registers 503 and 504 may each include multiple fields corresponding to the types of pertinent information that are extracted from network transactions. In one suitable embodiment, the information extracted from each network transaction includes a physical address field 505, a transaction type field 506, and a node ID field 507. Mask register 504 defines which bits of the information extracted from network transactions are considered when determining whether a given network transaction matches in region filter 502. Match register 503 indicates the value required in those bits of the extracted information that are evaluated (i.e., those bits that were not masked by mask register 504) to produce a match. If, for example, all bits in node ID field 507, all bits in transaction type field 506, and the least significant 8 of 33 total bits in physical address field 505 are clear in mask register 504 while the most significant 25 bits are set in mask register 504, then only the most significant 25 bits of the physical address information from the network transactions being monitored are considered in determining whether the transaction matches in region filter 502. In this example, the match and mask registers define a contiguous region of physical address space. The size of this region is defined by the number of masked address bits and the lower boundary of this region is defined by upper 25 bits of match register 503. During system operation, the value stored in the most significant 25 bits of physical address field 505 of match register 503 is compared to the most 25 significant address bits of the network transactions being monitored. If the 25 most significant bits of a monitored transaction equal the 25 most significant address bits of match filter 503, then the monitored transaction matches in region filter 502. It will be appreciated that match and mask registers 503 and 504 provide means for defining regions of the physical address space for monitoring as well as means for controlling which types of transactions and which nodes are to be monitored. For example, all transactions from a single node can be monitored by clearing all address and transaction type bits and setting all mask bits in node ID field 507 and setting the match bits in node ID field 507 to the value of the desired node.

Figure 5C:
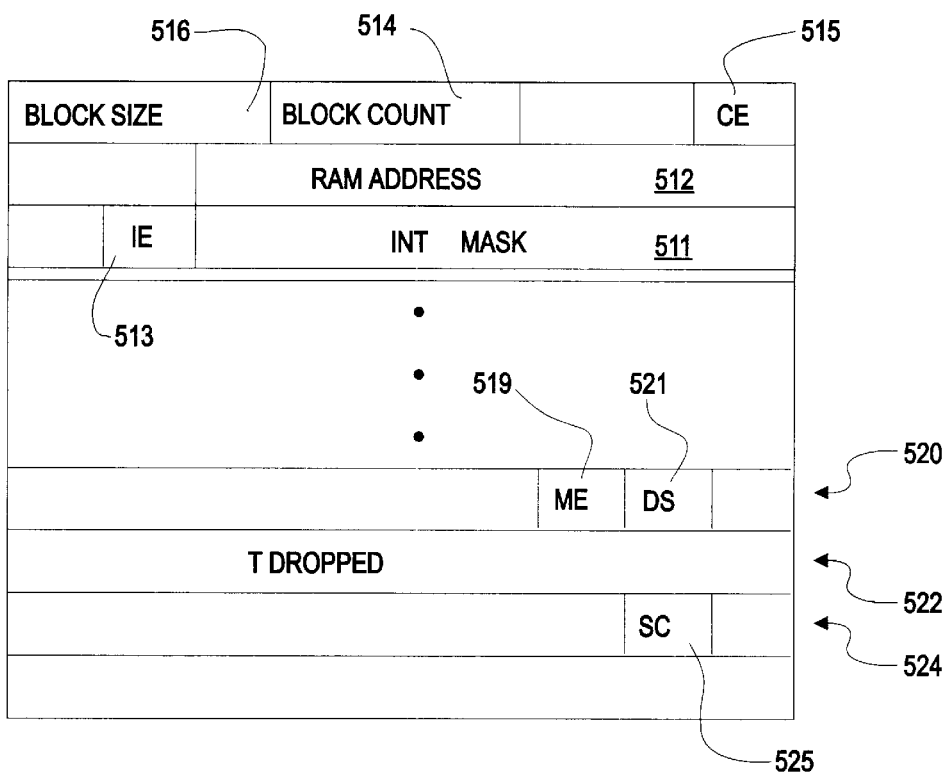
FIG. 5C is a diagram of programmable register set of the performance monitor including a region descriptor according to a preferred embodiment of the present invention.

In a presently preferred embodiment of performance monitor 106, each region 500 is further divided into a plurality of memory blocks 144. Turning to FIG. 5C, a representation of programmable register set 142 is shown as including a region descriptor 510 according to one embodiment of the present invention. Each region 500 is divided into a plurality of memory blocks 144 through the use of block count field 514 and block size field 516 of region descriptor 510. By specifying a region using match and mask register 503 and 504 as described previously, a block size in field 516, and a block count in field 514, boundaries for a corresponding region 500 and a potentially large number of memory blocks 144 are fully defined with only four operands. Moreover, by providing for fixed blocks sizes within a given region 500, the address boundaries of each memory block 144 may be algorithmically determined given the lower address boundary of region 500 and the block size such that a software routine in filter module 132 can associate a physical address extracted from interconnect 108 with a memory block 144. Region descriptor 510 as depicted further includes a RAM address field 512 that facilitates performance monitor 106 in associating a detected physical address with a block counter 136. More specifically, RAM address 512 is used as a pointer to a location within counter RAM 406 (depicted in FIG. 4).

Using the concept of a relatively small number of independently defined regions 500 and further dividing each region 500 into a potentially large number of memory blocks 144, filter module 132 offers tremendous flexibility in defining the portions of physical address space 145 that are to be monitored. As an example to demonstrate the possibilities offered by the filter module 132 according to the present invention, performance monitor 106 could be programmed to monitor two hypothetical regions of physical address space 145, namely, a first region 500x defined by a first region filter 502x and a first region descriptor 510x and a second region 500y defined by a second region filter 502y and a second region descriptor 510y. First region 500x is defined, through appropriate programming of first region filter 502x and first region descriptor 510x, to comprise just two memory blocks 144, each 1 MB in size. In contrast, second region 500y is defined to include thousands of memory blocks 144, where each memory block 144 of second region 500y is comprised of just 32 bytes, as defined in second block size field 516y. Thus, first region 500x enables a macroscopic view of relatively large portions of physical address space 145 while second region 500y provides a microscopic view of a second portion of physical address space 145. Moreover, first region 500x and second region 500y may overlap one another and may even comprise the same portion of address space 145. In an embodiment in which performance monitor 106 is connected to interconnect network 108, the region descriptors 510 and other dedicated registers for storing a variety of status and control information for performance monitor 106 are located in programmable register unit 142 that is coupled to filter module 132 and to I/O bus 126 via programming interface 149. In an alternative embodiment (not depicted), performance monitor 106 and programming interface 149 are connected to system bus 122 node 101. In the preferred embodiment, each region descriptor includes a counter enable (CE) bit 515. As its name implies, CE bit 515 enables and disables the respective region counter. When a region's CE bit is disabled, memory block counters 136 associated with the region's memory blocks 144 are inhibited from incrementing.

Figure 6:
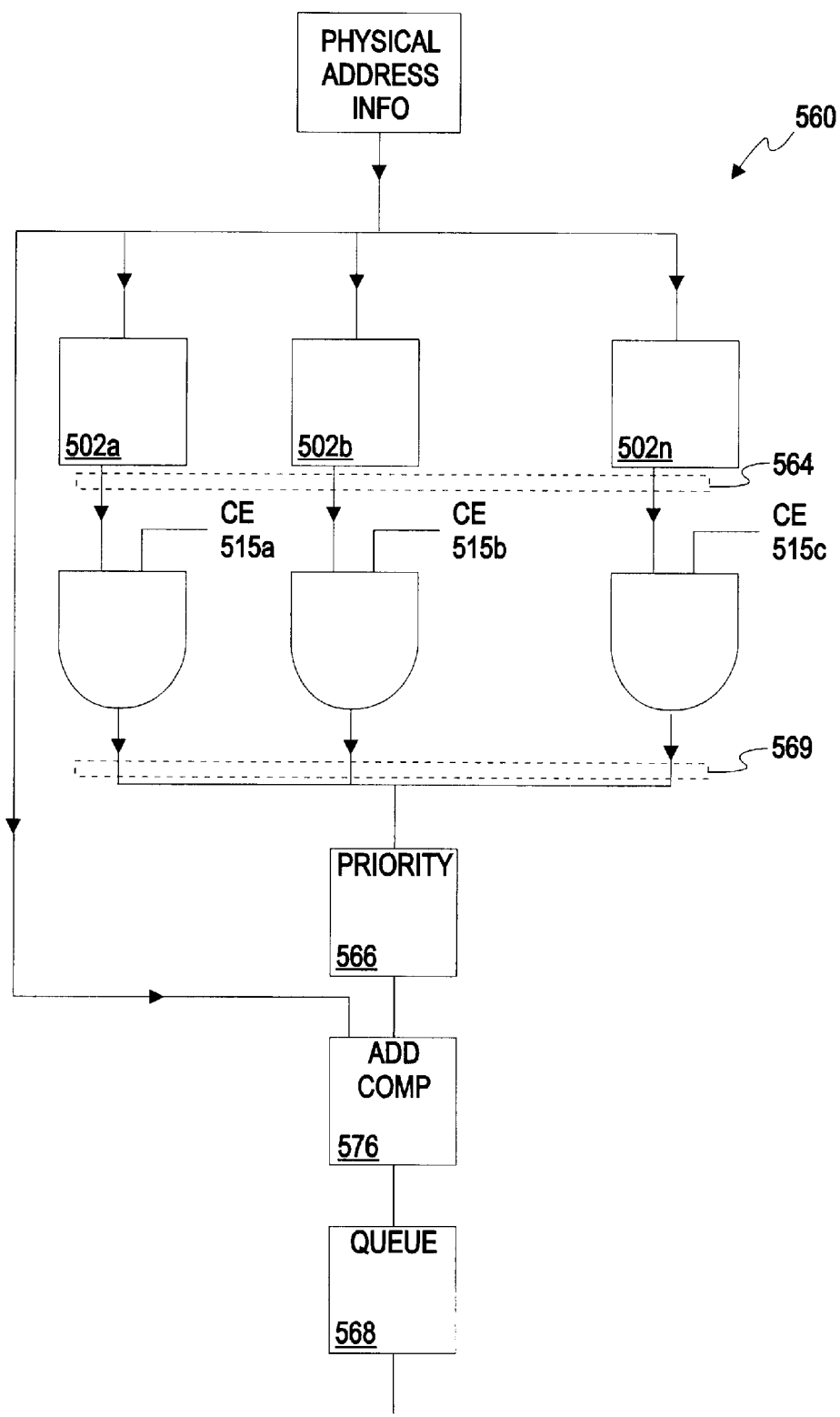
FIG. 6 is a block diagram depicting additional detail of one embodiment of the performance monitor of FIG. 3.

In embodiments of performance monitor 106 utilizing the memory region concepts discussed previously, filter module 132 will include a filter stage 560 as shown in FIG. 6. Filter stage 560 is comprised of a plurality of region filters 502 configured wherein an output 563 of each filter 502 is indicative of whether the pertinent information such as the physical address, the transaction type, and the node ID of the transaction being monitored matched in the corresponding region. In a presently preferred embodiment, 24 potentially overlapping memory regions 500 are definable. In this embodiment, filter stage 560 of filter module 132 produces a 24 bit match vector 564 indicating the region filters in which the physical address under consideration matched. Each bit in the 24 bit match vector 564 is logically ANDed with a counter enable (CE) bit 515 from the corresponding region descriptor 510 to produce a vector 569 that indicates the enabled memory regions in which the transaction address matched. In one embodiment, if an address matches in more than one enabled memory region, a prioritization occurs in priority unit 566 to prevent the transaction from causing more than one block counter 136 to increment. In one prioritization scheme, the enabled region with the highest index wins the prioritization.

After identifying a region 500 in which a transaction will be accounted for, the physical address information associated with the transaction, coupled with information stored in region descriptor 510, an address computation unit 567 of filter module 132 determines the memory block 144 and the associated memory block counter 136 corresponding to the address information and the selected memory region 500. In one embodiment, each memory block is identified by an index value starting with the first memory block 144 (identified by reference indicator 144-0 in FIG. 5A) in the first memory region 500 and proceeding through to the last memory block 144 in the last memory region 500. This memory block index value is then used to address a random access memory device thereby creating the association between a physical address and a memory block 144 and memory block counter 136. Using this approach, the array of memory block counters 136 can be implemented with a SRAM or other suitable random access memory device. Referring back to FIG. 4, performance monitor 106 as shown includes such a device in the form of SRAM device 406. In one embodiment, SRAM 406 comprises a 36×512K static RAM thereby permitting up to 512K memory block counters 136, each with its own associated memory block 144.

When a qualifying transaction (i.e., a transaction that matches in an enabled memory region 500) is detected, it is queued in a buffer 568. Buffering of qualifying transactions is necessary in embodiments in which memory block counters 136 are implemented with a random access memory device because of the multiple cycles required to update a random access memory cell. Incrementing a RAM cell requires that the current value be fetched from the appropriate memory block counter 136, incremented, and then stored back in the counter. It will be apparent that this sequence consumes multiple cycles of performance monitor 106. Because qualifying transactions may arrive at performance monitor 106 in each cycle, it is possible that the buffer queue 568 may reach its capacity and that a qualifying transaction may have to be deleted before performance monitor 106 is able to retire the transaction and update the appropriate memory block counter 136. In the preferred embodiment, performance monitor 106 includes a transaction dropped register 522 in the programmable register set 142 that is incremented each time a qualifying transaction is prematurely retired from buffer queue 568.

In an embodiment of the present invention emphasizing the ability to associate a remote access with the application that caused it, each memory block counter 136 has an associated pointer field 138. In response to a qualifying transaction that is successfully retired after incrementing a memory block counter 136, an address mapping module 134 of performance monitor 106 interprets the pointer field 138 and increments one or more secondary counters 140 (also referred to in this disclosure as access counters) if a mapping mode is selected (preferably by appropriate setting of a secondary counter bit (SC) bit 525 in a secondary counter status register 524). Address mapping module 134 coupled with the pointer field 138 enables performance monitoring of concurrently executing applications on a per application basis by providing a mechanism to associate a physical memory block 144 with a range of virtual addresses of one (or more) of the concurrently executing applications. This mechanism is advantageous in systems employing a virtual memory architecture because the code and data for a single application are typically stored in multiple physical memory addresses that are unlikely to be continuous and that may change during the execution of an application. Address mapping module 134, together with pointer field 138 and secondary counters 140 provide a means of associating a plurality of physical memory blocks with a single counter. Referring to FIG. 3 again, memory blocks 144a, 144b, and 144c could represent the physical address blocks that comprise the code and data segments for a single application. If the pointer fields 138 of each memory block counter 136 associated with memory blocks 144a, 144b, and 144c are set to point to the same secondary counter 140 and a mapping mode is enabled through the appropriate setting of one or more status bits such as SC bit 525, a single secondary counter 140 can be used to monitor the performance of a selected portion of the virtual address space. Thus, in this mode, secondary counters 140 serve as access counters. In one embodiment, the operating system can assist in the setting of pointer fields 138 by accessing the segment descriptors and paging tables of local node 102 to determine the mapping between the virtual memory space and the physical address space. In the preferred embodiment, each of the secondary counters 140 is implemented as a dedicated high speed register that can be accessed and incremented in a single cycle of performance monitor 106. When the mapping mode is disabled, the secondary registers can be used as an additional set of memory block counters similar to block counters 136. In one such embodiment, each secondary counter 140 could be associated with a region filter 502 when the mapping mode is disabled. If a transaction matched an enabled region filter 502, the associated secondary counter would be incremented. In the preferred embodiment, each secondary counter 140 includes its own enable bit. Ideally, pointer field 138 includes sufficient bits to enable random selection of the secondary counter 140 to which a given memory block counter 136 points. If, for example, a particular embodiment of performance monitor 106 included 8 secondary counters 140, pointer field 138 might suitably include 8 bits. In other embodiments in which resources are scarce, however, alternative schemes may be employed to associate the pointer field 138 with secondary counters 140. In an example of performance monitor 106 in which, for example, a 36×512K static RAM is used to implement the array of memory block counters 136, each memory block counter 136 may comprise just 32 bits thereby leaving four bits for use as pointer field 138. In conjunction with a secondary count mode field in the secondary counter status register 524, pointer field 138 could specify which of one or more secondary counters are to be incremented.

Figure 7:
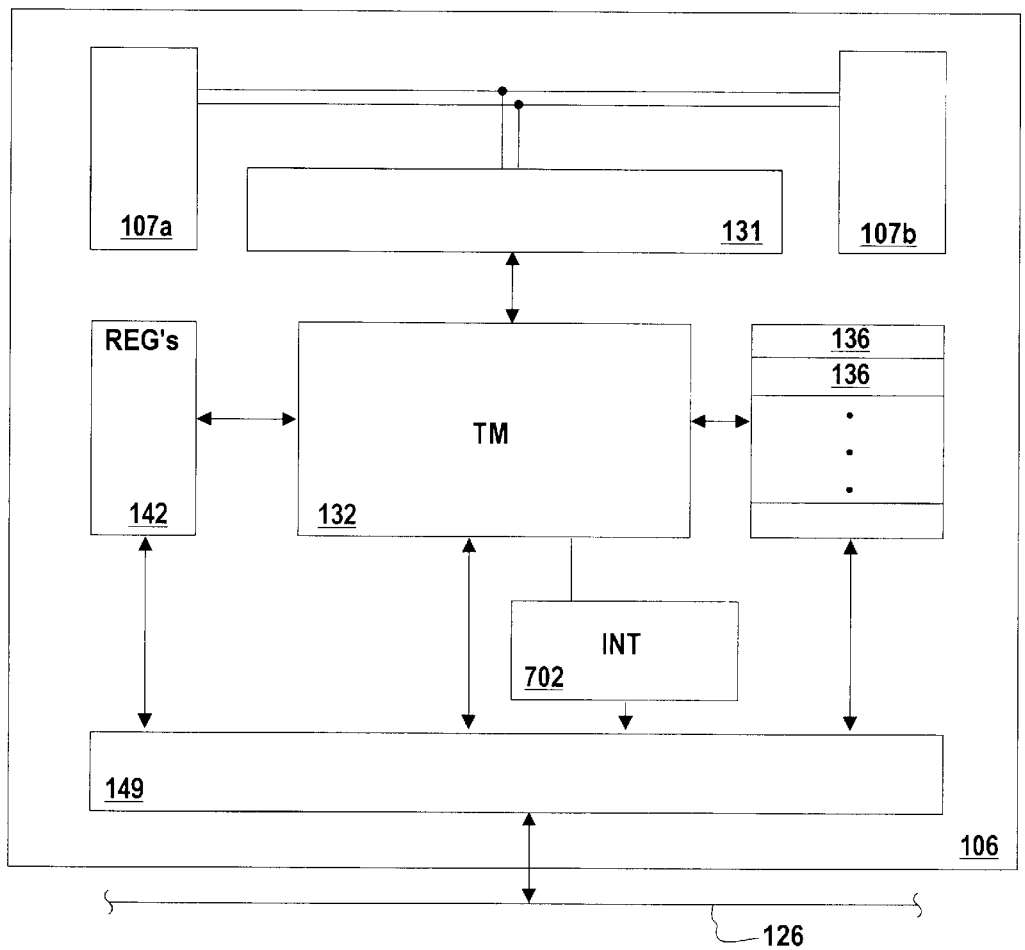
FIG. 7 is a block diagram of an embodiment of the performance monitor of FIG. 1 that includes an interrupt unit.

Turning now to FIG. 7, an embodiment of the invention emphasizing the ability to dynamically alter settings of performance monitor 106 in response to certain events is presented. In a first embodiment depicted in FIG. 7, performance monitor 106 includes signal processing units 107a and 107b, extraction unit 131, programmable register set 142, filter module 132 and an array of memory block counters 136 all substantially as described previously. As shown in FIG. 7, however, performance monitor 106 includes an interrupt unit 702 coupled to filter module 132. Interrupt unit 702 is utilized in conjunction with an interrupt mask 511 in region descriptor 510. Interrupt mask 511 defines a threshold value for the block counters 136 associated with the memory region 500. Interrupt unit 702 monitors values stored in each block counter 136 associated with a memory region 500 with which interrupt mask 511 is associated. If any of the memory block counter values reaches the threshold value implied by interrupt mask 511, interrupt unit 702 issues a hardware interrupt if an interrupt enable bit 513 of the region's descriptor 510 is set. Preferably, the hardware interrupt is routed to the processors 120 of local node 102 possibly through a programmable interrupt controller (not depicted). In response to detecting the interrupt from performance monitor 106, processors 120 can initiate a interrupt response routine to take an appropriate action. In one embodiment, local node 102 responds to the interrupt by initiating a replication or migration of the page containing the memory block 144 that produced the interrupt in an effort to relocate a segment of code or data to a more suitable node 101. If, for example, performance monitor 106 of local node 102 is programmed to monitor incoming transactions and one of the memory block counters 136 reaches a threshold value (as defined by INTMASK 511 of the region descriptor 510 associated with the memory block 144), the interrupt might indicate that local node 102 is generating a relatively large number of remote access to the memory block 144 associated with the interrupt. Under these circumstances, the page containing the block of physical memory might be more suitably located in the local memory 128 of local node 102 and the interrupt handling routine that is initiated in response to the interrupt could relocate the page containing the memory block 144 to local memory 128 of local node 102. The benefits offered by this page migration technique are more suitably realized in an embodiment in which performance monitor 106 resides on system bus 122 rather than interconnect 108 due to the inherent inability of performance monitor 106 to monitor local accesses via interconnect 108. This limitation prevents performance monitor 106, when coupled to interconnect 108, from comparing the frequency or quantity of local accesses associated with a particular memory page with the frequency or quantity of remote accesses associated with that page. If local access to a particular page are more frequent than remote accesses from any remote node, then the page should not be migrated, but a monitor coupled to interconnect 108 will be unable to make this determination.

Ideally, the interrupt handling routine detect situations in which a particular memory block results in a large number of remote accesses regardless of the node on which it resides and disables further interrupts associated with the memory block. If, for example, a memory block is frequently accessed by all nodes, it makes little difference on which node the block resides because, no mater where the block resides, the remaining nodes must access the block remotely. Under these circumstances, the interrupt handling routine might suitably determine that the interrupt mechanism should be disabled with respect to certain memory blocks and could clear interrupt enable IE bit 513 of region descriptor 510 thereby inhibiting the memory blocks in that region from causing additional interrupts. This ability to disable the interrupt mechanism for selected memory blocks or regions eliminates a significant amount of interrupt handling that would otherwise occur and prevents unnecessary "thrashing" of highly accessed memory blocks or regions from one node 101 to another. Utilizing this concept, implemented with appropriate interrupt handlers, the invention contemplates dynamically moving memory blocks around on system 100 in response to interrupts generated by the memory blocks counters 136.

Another embodiment of the invention contemplates combining the interrupt resources described with respect to FIG. 7 and the programmable memory block size discussed with respect to FIG. 5 to enable a performance monitor and method for precisely determining, through a iterative process, detailed information about a particular portion of the physical address space. In this embodiment, an interrupt is generated, as discussed previously, if a memory block counter 136 exceeds a programmable threshold value. When this occurs, it is frequently desirable to gather more detailed information about the particular memory segment that caused the interrupt. By using the programmable filters 502 and block count and block size fields 514 and 516, a suitable interrupt handling routine might determine which memory block is responsible for the interrupt and, in response, reprogram performance monitor 106 to gather more specific information about the physical memory address or addressees that are causing the interrupt by subdividing the region into smaller blocks for a particular portion of memory before continuing with additional monitoring. This embodiment of the invention contemplates an information gathering process in which a relatively large area of memory is monitored to determine broad blocks of code or data that result in a significant number of remote accesses. Upon discovering such a block, the monitor 106 is then be reprogrammed with a suitably smaller memory block size to obtain more precise information about the source of the problem. As an example, a first iteration of this embodiment of the invention might begin by monitoring a 512 MB memory region 500 broken into 512K memory blocks 144 each 1K in size. System 100 is monitored under these conditions until one of the memory block counters 136 reaches a threshold as specified in interrupt mask 511 of region descriptor 510. An interrupt handling routine is then invoked to determine the upper and lower physical address boundaries of the memory block 144 that produced the interrupt. These upper and lower physical addresses are then used to define a new memory region 500 that is further divided into a plurality of memory blocks. It will be appreciated that the memory block size for each successive iteration of this process is smaller than the block size for the previous iteration thereby enabling the gathering of progressively more precise information about memory locations that are associated with a large number of remote accesses. In one exemplary embodiment, block count field 514 of region descriptor 510 is a 19-bit field that permits specifying up to as many as 512K memory blocks 144 for a single memory region 500. A 4-bit block size field 516 in the presently preferred embodiment of performance monitor 106 permits specifying a block size from a minimum of 32 bytes (a useful minimum block size that corresponds to the size of a cache line in many embodiments of local node 102) to a maximum block size of 1 MB.

A NUMA system can be used as is, or can be partitioned into several nodes, with the nodes sharing only a pre-specified range of shared physical memory. Additionally, it is possible for various nodes to set shared memory for themselves to communicate instead of passing messages over the interconnect. Hardware limitations dictate that the entire memory in the system be available to each node to enable the aforementioned functionality. However, allowing a node in such a system full access to the entire physical memory available may cause problems if, through software bugs, the node tries to read or write to memory that is logically private to another node, but has been physically made accessible to the node on which the erroneous software runs. Therefore, it is desirable to detect such erroneous accesses if they occur. One method of doing so using performance monitor 106 is to set interrupt mask 511 to 0 for the regions of physical memory that are logically private to each node but otherwise made accessible because of physical limitations. By setting the interrupt mask 511 of such a region to 0, performance monitor 106 will generate an interrupt upon the first erroneous access to the shared memory that traverses the interconnect, thereby notifying the operating system at one of the nodes of the situation so that it may take remedial actions (e.g., reboot the node on which the software has issued the erroneous access, notifying the system operator of the problem, etc.).

Figure 8:
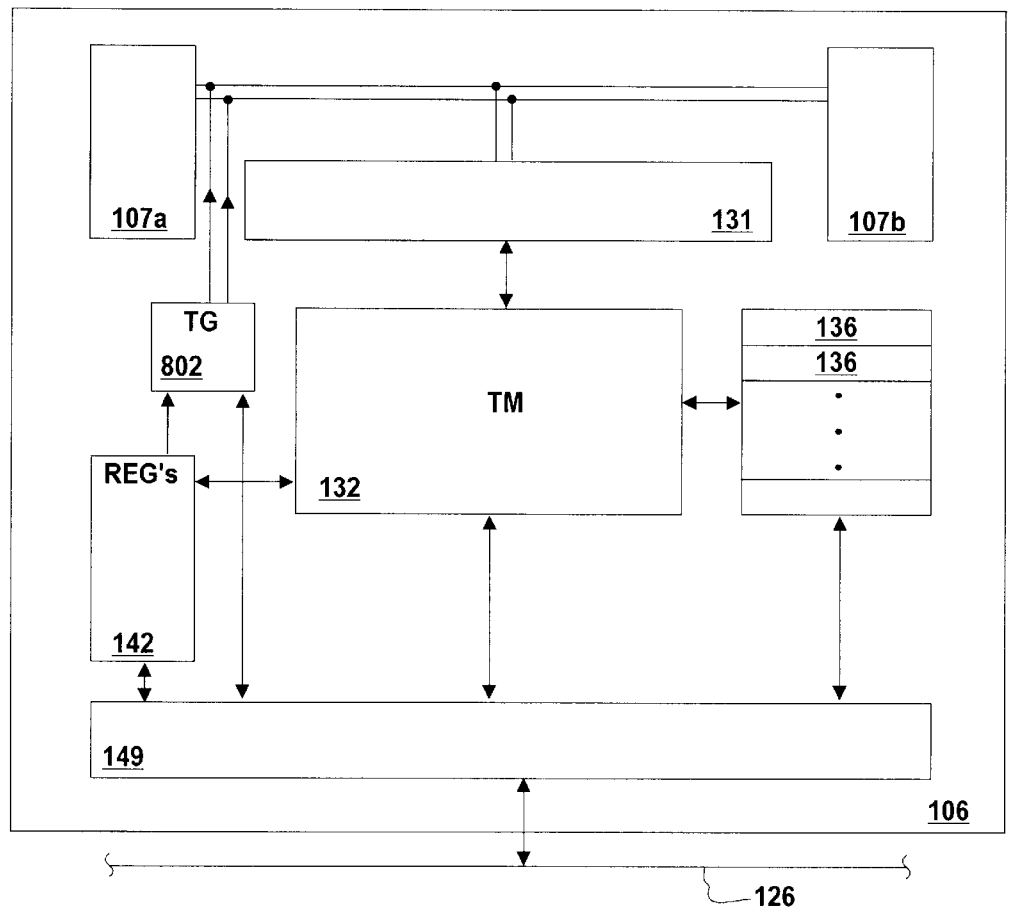
FIG. 8 is a block diagram of an embodiment of the performance monitor of FIG. 1 that includes a transaction generator.

Turning now to FIG. 8, an embodiment of performance monitor 106 including a transaction generator 802 is depicted. This embodiment of the invention recognizes and addresses practical difficulties in designing and testing the circuitry of performance monitor 106 and the software controlling it and in obtaining a functional NUMA system for test and verification purposes. Transaction generator 802 is configured to issue precisely defined transactions at precisely defined intervals. The transactions are representative of memory transactions that would appear on interconnect network 108 during normal system operation. In one embodiment, performance monitor 106 includes an ME bit 519 in program monitor status register 520. When monitor enable (ME) bit 519 is set, transaction generator 802 is disabled and performance monitor 106 monitors transactions on interconnect network 108 as described in the preceding paragraphs. When ME bit 519 is cleared, transaction generator 802 is enabled and becomes the source of transactions on interconnect network 108. Depending upon the setting of DS bit 521 transactions generated by transaction generator 802 simulates incoming transactions or outgoing transactions. Simulation of the incoming transactions permits verification of the design and implementation of performance monitor 106 while simulation of outgoing transactions is useful in exercising the interconnect network.

It will be apparent to those skilled in the art having the benefit of this disclosure that the present invention contemplates a flexible device and method for monitoring aspects of the performance of a distributed memory system such as a NUMA computer system. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A performance monitor, comprising:
    an interface suitable for coupling to an interconnect network of a computer system, the interconnect network linking a local node of the computer with at least one remote node of the computer, wherein the interface is configured to extract physical address information from a transaction traversing the interconnect network;
    a translation module adapted for associating the physical address with one of a plurality of memory blocks and, responsive thereto, incrementing a memory block counter corresponding to the memory block; and
    an interrupt unit configured to assert an interrupt if the at least one block counter exceeds a predetermined value.

2. The performance monitor of claim 1, wherein the interface unit is configurable to selectively monitor either incoming or outgoing transactions.

3. The performance monitor of claim 1, wherein the translation module includes a plurality of region filters configured to receive the physical address, wherein each of the region filters is associated with a contiguous region of physical address space and further wherein an output of each of the filters is indicative of whether the physical address lies within the region.

4. The performance monitor of claim 3, wherein each of the regions is comprised of at least one of the plurality of the memory blocks.

5. The performance monitor of claim 4, wherein the size and number of memory blocks comprising each of the regions is programmably defined by a region descriptor, wherein the region descriptor includes a base address and wherein the region descriptor is programmably alterable via a programming interface coupled to an I/O bus of the local node.

6. The performance monitor of claim 1, wherein the block counters are comprised of a random access memory device.

7. The performance monitor of claim 1, wherein each of the block counters is associated with a programmable interrupt disable bit operable to prevent the interrupt unit from asserting an interrupt corresponding to the associated block counter.

8. The performance monitor of claim 1, further comprising a transaction generator coupled to the interconnect network and operable to issue specified transactions at specified intervals if a monitor enable bit of the performance monitor is disabled.

9. The performance monitor of claim 8, wherein the performance monitor is configurable to issue either outgoing transactions or incoming transactions.

10. A computer system, comprising:
    a local node including at least one processor coupled to a local memory of the local node via a local bus of the local node;
    at least one remote node, each including at least one processor coupled to a local memory of the remote node via a local bus of the remote node;
    an interconnect network coupling the remote node to the local node via which the local node can access the local memory of the remote node and the remote node can access the local memory of the local node; and
    a performance monitor including an interface suitable for coupling to the interconnect network and configured to extract physical address information from a transaction traversing the interconnect network, a translation module adapted for associating the physical address with one of a plurality of memory blocks and, responsive thereto, incrementing at a block counter corresponding to the memory block, and an interrupt unit configured to assert an interrupt if the block counter exceeds a predetermined value.

11. The computer system of claim 10, wherein the translation module includes a plurality of region filters adapted to receive the physical address information, wherein each the region filter is associated with a contiguous region of the system's physical address space and further wherein an output signal of each filter is indicative of whether the physical address lies within the region.

12. The system of claim 11, wherein each of the regions is comprised of at least one of the plurality of the memory blocks.

13. The system of claim 12, wherein the number and size of the memory blocks comprising each of the regions is programmably alterable via a programming interface.

14. The system of claim 10, wherein the computer system is configured to respond to the interrupt from the interrupt unit by decreasing the size of the memory blocks in the region associated with the interrupt.

15. The system of claim 10, wherein the computer system is configured to respond to the interrupt by migrating the contents of the memory block responsible for triggering the interrupt to a different node.

16. The system of claim 10, further comprising a transaction generator coupled to the interconnect network and operable to issue specified transactions at specified intervals if a monitor enable bit of the performance monitor is disabled.

17. A method of monitoring performance of a computer system comprising:
    defining physical address boundaries for a plurality of memory blocks;
    extracting physical address information from transactions traversing an interconnect network of the computer system, the interconnect network linking a local node of the computer system with at least one remote node of the computer system;
    associating the physical address with one of the plurality of memory blocks and, in response thereto, incrementing a block counter corresponding to memory block; and asserting an interrupt if the block counter exceeds a specified maximum.

18. The method of claim 17, wherein the step of defining the memory blocks comprises:

defining a memory region by programming a base address field of a region descriptor; and dividing the memory region into the memory blocks by programming a block size and block count of the region descriptor.

19. The method of claim 17, further comprising, in response to the interrupt, migrating the contents of the memory block responsible for the interrupt to a different node.

20. The method of claim 17, further comprising, in response to the interrupt, subdividing the memory block responsible for the interrupt into a plurality of smaller memory blocks and repeating the steps of claim 14.

* * * * *